UNITED STATES PATENT OFFICE.

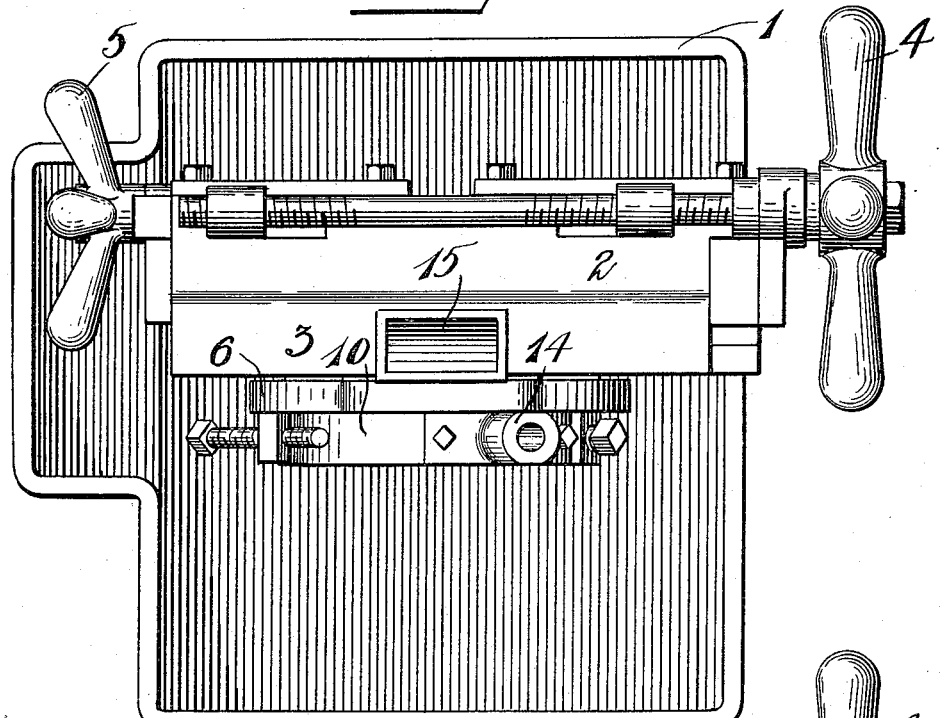

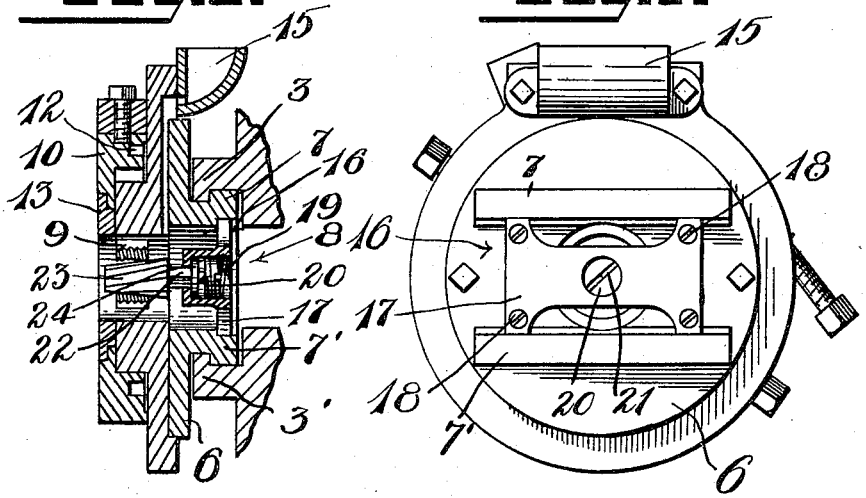

RICHARD L. DEZENDORF, OF RICHMOND HILL, NEW YORK.

PIPE THREADING AND REAMING MACHINE.

1,175,935.  Specification of Letters Patent.  Patented Mar. 21, 1916.

Application filed January 10, 1913. Serial No. 741,214.

*To all whom it may concern:*

Be it known that I, RICHARD L. DEZENDORF, a citizen of the United States, residing at Richmond Hill, Queens county, State of New York, have invented certain new and useful Improvements in Pipe Threading and Reaming Machines, of which the following is a full, clear, and exact description.

My invention relates to inventions in pipe threading and reaming machines, and has for its object to provide a machine in which the reamer is united to the die-head so as to be transversely movable therewith into alinement with the axis of the pipe to be threaded and reamed and away therefrom so as to be removed from the opening in the die-head support to a position where it will not interfere with the movement of the pipe through said hole for either insertion in or removal from the machine.

The following is a description of an embodiment of my invention, reference being had to the accompanying drawings, in which—

Figure 1 shows a plan view of a die-head and its support embodying my invention. Fig. 2 is a side elevation of the same, looking in a direction from the clutch. Fig. 3 is a section on the line 3—3, Fig. 2, with the main portion of the die-head support broken away. Fig. 4 is a rear view of the die-head and the reamer carried thereby. Fig. 5 is a detail view of a modified form of the reamer designed to be attached to a die-head already in use without the necessity of machining.

Referring more particularly to the drawings, 1 is a base plate adapted to be clamped to the bed (not shown) of the machine, to which bed is also clamped the support for the ordinary driving pulleys and clutch (not shown).

2 is a die-head support secured to the base 1 and provided with slides 3—3'. The support is also provided with handles 4 and 5 for operating the pipe gripping and cutting devices (not shown, since they do not constitute part of my invention).

6 is a die-head block having grooved flanges 7—7' which are held by the slides 3—3', so that the die-head may be given a transverse movement into alinement with the hole 8 in the support, or so as to uncover said hole.

9 are four thread-cutting dies adapted to slide in and out in grooves in the die-head block.

10 is an oscillating cam plate having cam grooves 11 therein, which engage projections 12 on the outer ends of the cutting dies.

13 is a plate screwed to the die head block and covering the grooves in which the dies slide, and securing the cam plate 10 in position.

14 is a handle socket secured to the cam plate 10 for oscillating the same so as to move the thread-cutting dies into cutting position and remove them from that position.

15 is an oil cup for supplying oil to the tube and to the cutting devices. In the rear of the die-head block is a recess 16. In this recess I mount a reamer consisting of a reamer-support 17 secured to the die-head block by screws 18 or other suitable means and a reamer tool. The reamer-support has a screw-threaded aperture 19 having its rear end closed by a screw-threaded plug 20 having a screw-driver slot 21. In the front wall of this recess 19 is an opening through which passes the shank 22 of a reamer tool 23, the shank being provided with a suitable head 24 so as to limit its outward movement. By adjusting the screw plug 20 the rearward movement of the reamer tool can be limited. The shank 22 and the hole through which it passes are angular so as to prevent the turning of the reamer tool.

The reamer tool 23 is tapered so that the size of the hole which it reams will be varied according to the adjustment of the plug 20. By locating the reamer tool and its support in the recess in the die-head block, the transverse movement of the die-head upon the slides 3—3' is not interfered with, and the axes of the thread-cutting dies and reamer can be brought into alinement with the pipe to be threaded and reamed and the hole 8, or the die-head and reamer can be easily moved to one side so as to uncover the hole 8 and permit the reamed and threaded pipe or the pipe to be reamed and threaded to be removed from or inserted through the hole 8. The reaming action, when the parts are in operative position, takes place simultaneously with or near the end of the thread-cutting action. Neither the thread-cutting-dies nor the reamer interferes with the action of the other, but the two operations are carried on with one adjustment of the pipe and the two parts are removed from operative location simultaneously by a single action of the operator. Both are supplied with oil from the same oil cup 15. The reamer support 17 is shown as removably attatched to the die-head block, and that is a preferable construction.

In order to provide means whereby the reamer and its support may be attached in proper position to a die-head having a suitable recess 16 without the machining necessary for providing holes for the screws 18, I have made a modified reamer support 17' shown in Fig. 5, in which set screws 25 and 26 are provided for engaging suitable parts of the slides 3—3' to hold the reamer support in position.

As will be evident to those skilled in the art, my invention permits of various other modifications without departing from the spirit thereof or the scope of the appended claims.

What I claim is:

1. In a pipe threading and reaming machine, the combination of a support having suitable transverse slides and a central opening, a die-head carrying thread-cutting dies and movable transversely on said slides into alinement with and away from said opening, said die-head having a die-head block, and a reamer secured to said die-head block so as to be movable with said die-head, said die-head having a common oil cup for delivering oil to said dies and said reamer.

2. In a pipe threading and reaming machine, the combination of a support having transversely extending slides and a central opening, a die-head movable transversely on said slides into alinement with and away from said opening, said die-head having a die-head block provided with a transversely extending recess in its rear face, and a reamer having a transversely extending support within said transverse recess so as to be transversely movable with said die-head, said transversely movable support having projections in vertical planes provided with faces engaging portions of said die-head and holding said transversely extending support against transverse movement relative to said die-head.

3. In a pipe threading and reaming machine, the combination of a support having transversely extending slides and a central opening, a die head movable transversely on said slides into alinement with and away from said opening, said die head having a die head block provided with a transversely extending recess in its rear face, and a reamer having a transversely extending support removably secured within said transverse recess so as to be transversely movable with said die head, said transversely extending support having projections in vertical planes and set screws in said projections engaging portions of said die head and holding said transversely extending support in position.

RICHARD L. DEZENDORF.

Witnesses:
    H. B. BROWNELL,
    E. E. MORSE.

Copies of this patent may be obtained for five cents each, by addressing the "Commissioner of Patents, Washington, D. C."